(No Model.)

A. SCHWERTER.
SECONDS HAND TOOL FOR WATCH MAKERS.

No. 442,142. Patented Dec. 9, 1890.

WITNESSES:
Frank S. Olson
Mamie J. Kelly

INVENTOR
Augustus Schwerter,
BY Baldwin, Davidson & Wight,
ATTORNEYS.

UNITED STATES PATENT OFFICE.

AUGUSTUS SCHWERTER, OF NEW YORK, N. Y.

SECONDS-HAND TOOL FOR WATCH-MAKERS.

SPECIFICATION forming part of Letters Patent No. 442,142, dated December 9, 1890.

Application filed May 23, 1890. Serial No. 352,902. (No model.)

*To all whom it may concern:*

Be it known that I, AUGUSTUS SCHWERTER, a citizen of the United States, residing at New York, in the State of New York, have invented a new and useful Seconds-Hand Tool for Jewelers, of which the following is a specification.

The object of my invention is to provide a tool by which the seconds-hand of watches and other time-pieces may be firmly held while the tubular bearing which is usually attached to the seconds-hand may be worked upon either to shorten it by filing or to enlarge its bore, all as is well understood by those familiar with the trade.

Tools have heretofore been invented for holding seconds-hands; but as far as I am aware the tool herein illustrated and described is new in construction and possesses capacities and advantages not incident to the other tools with which I am acquainted.

Figure 1:
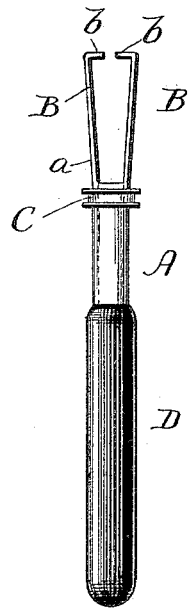
Figure 2:
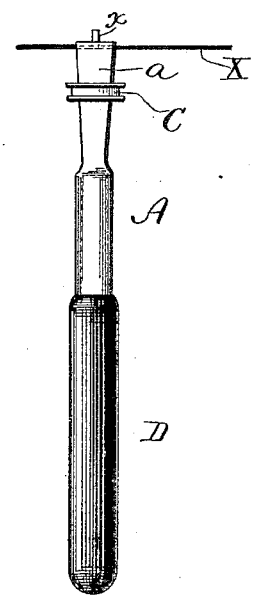
Figure 3:
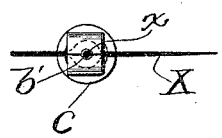
Figure 4:
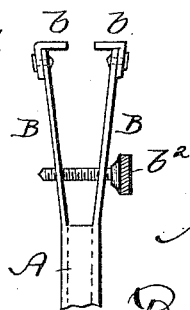

In the accompanying drawings, Figure 1 is an elevation of one side of the tool; Fig. 2, an elevation of the opposite side with the seconds-hand held in the tool; Fig. 3, a plan view of the same, and Fig. 4 illustrates a modification.

In forming this tool I preferably take a tube A, of suitable metal—as, for instance, brass, steel, or iron—of about three-eighths of an inch in diameter, more or less, when the tool is to be used for the seconds-hands of watches, and of about one and one-quarter inch, more or less, in length. I then file, saw, or otherwise remove two opposite sides of the tube at $a\ a$ from one end to a point at about the middle of the tube, so as to leave two spring-rods or arms B B. These are bent toward each other at right angles, as indicated at $b\ b$, so as to form two vise-jaws that may be clamped together by a ferrule or sliding ring C, stripped on the tube, or the jaws may be of separate pieces of metal and riveted or otherwise secured to the arms B, as indicated in Fig. 4. In the center of the line formed by the junction of the edges of the two jaws $b\ b$ is drilled a small hole $b'$ in the direction of the center of the tube. The recesses thus formed in the jaws $b\ b$ are to receive and grasp the tubular portion $x$ of a seconds-hand X, the seconds-hand lying under the jaws $b\ b$ and the tube projecting therefrom, as clearly shown in Fig. 2. A suitable handle D may be inserted in the opposite end of the tube, or the tube itself may be the handle. When the seconds-hand is thus firmly held, the tube $x$ may be either enlarged by a broach or filed down or cut away, as may be desired, without danger of twisting or warping the connection between the tube and the seconds-hand, and without, also, any danger of injuring the seconds-hand itself, as is liable to be the case where the seconds-hand is grasped by its edges, as has heretofore usually been the case. The jaws $b\ b$ are made narrow or thin and with a straight plane surface, so that the seconds-hand may lie within them and rest against their inner faces, while the hub of the hand projects outside the jaws. Instead of using a ferrule I may use a screw $b^2$ for clamping the arms B, as indicated in Fig. 4.

I claim as my invention—

1. The herein-described tool, formed from a metal tube and having the spring-arms B B, the jaws $b\ b$, having the recesses $b'$ therein, and the sliding ring.

2. The herein-described jeweler's tool, having a handle D, parallel spring-arms B B, bent at right angles at their ends to form vise-jaws $b\ b$, each having a recess $b'$, adapted to grasp the tube of the seconds-hand, and the sliding ring C, substantially as set forth.

In testimony whereof I have hereunto subscribed my name.

AUGUSTUS SCHWERTER.

Witnesses:
LLOYD B. WIGHT,
MAMIE J. KELLEY.